US012581210B2

(12) United States Patent
Rhee et al.

(10) Patent No.: US 12,581,210 B2
(45) Date of Patent: Mar. 17, 2026

(54) THERMAL IMAGE SENSOR AND ELECTRONIC DEVICE INCLUDING THE SAME

(71) Applicant: SAMSUNG ELECTRONICS CO., LTD., Suwon-si (KR)

(72) Inventors: Choongho Rhee, Suwon-si (KR);
Byonggwon Song, Suwon-si (KR);
Jangwoo You, Suwon-si (KR);
Jaekwan Kim, Suwon-si (KR);
Jinmyoung Kim, Suwon-si (KR);
Wontaek Seo, Suwon-si (KR);
Yongseop Yoon, Suwon-si (KR);
Byungkyu Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 305 days.

(21) Appl. No.: 18/210,456

(22) Filed: Jun. 15, 2023

(65) Prior Publication Data

US 2024/0121524 A1     Apr. 11, 2024

(30) Foreign Application Priority Data

Oct. 11, 2022     (KR) ........................ 10-2022-0129755

(51) Int. Cl.
*H04N 25/21*     (2023.01)
*G01K 7/36*     (2006.01)
(52) U.S. Cl.
CPC .............. *H04N 25/21* (2023.01); *G01K 7/36* (2013.01)

(58) Field of Classification Search
None
See application file for complete search history.

(56) References Cited

U.S. PATENT DOCUMENTS

| | | |
|---|---|---|
| 7,510,883 B2 | 3/2009 | Chung et al. |
| 9,000,373 B2 | 4/2015 | Beratan |
| 2002/0117623 A1* | 8/2002 | Cole ..................... H10F 39/805 438/65 |
| 2006/0188400 A1* | 8/2006 | Sasaki ....................... G01J 5/08 422/82.02 |
| 2011/0266443 A1 | 11/2011 | Schimert et al. |
| 2019/0178718 A1* | 6/2019 | Kawasaki ................. G01J 5/06 |
| 2021/0247239 A1* | 8/2021 | Qoutb ................... G01K 13/00 |

OTHER PUBLICATIONS

Cetin et al., "Subwavelength perforated absorbers for infrared detectors", Optice Express, Oct. 26, 2020, pp. 33699-33707, vol. 28.
Yuan et al., "Temperature dependence of magnetoresistance in magnetic tunnel junctions with different free layer structures", Physical Review B 73, Apr. 3, 2006, 8 total pages.
Qoutb et al., "PMTJ Temperature Sensor utilizing VCMA", IEEE International Symposium on Circuits and Systems (ISCAS), 2019, 5 total pages.

* cited by examiner

*Primary Examiner* — Edwin C Gunberg
(74) *Attorney, Agent, or Firm* — Sughrue Mion, PLLC

(57) ABSTRACT
A thermal image sensor includes a substrate; a composite layer including an absorption layer and a sensor array layer provided below the absorption layer, the sensor array layer including a plurality of temperature sensing cells, the composite layer having a pattern formed therein, and the pattern including at least one hole penetrating through the absorption layer; and a support separating the substrate from the composite layer.

18 Claims, 22 Drawing Sheets

THERMAL IMAGE SENSOR AND ELECTRONIC DEVICE INCLUDING THE SAME

CROSS-REFERENCE TO RELATED APPLICATION

This application is based on and claims priority under 35 U.S.C. § 119 to Korean Patent Application No. 10-2022-0129755, filed on Oct. 11, 2022, in the Korean Intellectual Property Office, the disclosure of which is incorporated by reference herein in its entirety.

BACKGROUND

1. Field

The disclosure relates to a thermal image sensor and an electronic device including the same.

2. Description of Related Art

Examples of long wavelength infrared (LWIR) sensor types include a quantum type sensor and a thermal type sensor. There are several types of thermal type sensors depending on the driving principle and materials. For example, a bolometer sensor uses the principle that the resistance of a material changes according to temperature.

A bolometer sensor may include an absorption layer, a temperature sensing layer, a support that separates these layers from a substrate, and a reflective layer on the substrate. The absorption layer and the temperature sensing layer are spaced apart from the substrate by the support by a distance of $\lambda/4$ ($\lambda$ being an incident wavelength in units of $\mu$m). Due to the relatively short length of the support, thermal conductivity (1/R) is relatively high, and thus, heat dissipation through an anchor is fast, and the range of a temperature rise may be limited. In order to improve the sensor performance, a method of increasing a range of the temperature rise of the absorption layer in response to incident heat has been sought.

SUMMARY

Provided is a thermal image sensor of which thermal resistance and attainable temperature may be increased.

Further, provided is a thermal image sensor including a plurality of pixels.

Further still, provided is an electronic device including the thermal image sensor.

Additional aspects will be set forth in part in the description which follows and, in part, will be apparent from the description, or may be learned by practice of the presented embodiments of the disclosure.

According to an aspect of the disclosure, a thermal image sensor includes: a substrate; a composite layer including an absorption layer and a sensor array layer provided below the absorption layer, the sensor array layer including a plurality of temperature sensing cells, the composite layer having a pattern formed therein, and the pattern including at least one hole penetrating through the absorption layer; and a support separating the substrate from the composite layer.

The sensor array layer may further include an insulating layer around the plurality of temperature sensing cells and filling a region between the plurality of temperature sensing cells, and the at least one hole may pass through the insulating layer.

The pattern may be configured to increase a thermal resistance of the absorption layer.

The at least one hole may include a plurality of holes provided at edge regions of the composite layer, and each hole of the plurality of holes has a rectangular cross-section.

The at least one hole may include a plurality of holes provided at a center of the composite layer, and each hole of the plurality of holes has a square cross-section.

The at least one hole may have a cross-sectional shape of a circle, a triangle, a quadrangle, or an ellipse.

The at least one hole may include a plurality of holes, and, among the plurality of holes forming the pattern, first intervals between first holes of the plurality of holes in a center portion of the composite layer may be greater than second intervals between second holes of the plurality of holes at edge regions of the composite layer.

The absorption layer may have a multi-layer structure.

Each temperature sensing cell of the plurality of temperature sensing cells may include a magnetoresistive element.

The magnetoresistive element may include a first magnetic layer, a second magnetic layer on the first magnetic layer, and a tunneling barrier layer between the first magnetic layer and the second magnetic layer.

The first magnetic layer may have a fixed magnetization direction, and the second magnetic layer may have a changeable magnetization direction.

The magnetoresistive elements may be arranged in series or in parallel.

A width of the magnetoresistive element may be from about 10 nanometers to about 100 nanometers.

The thermal image sensor may further include a reflective layer provided on the substrate.

The thermal image sensor may further include a transmission cap provided on the substrate and covering at least a portion of the composite layer.

The transmission cap may be configured to selectively transmit through long-wave infrared rays.

According to an aspect of the disclosure, a thermal image sensor includes: a plurality of pixels in a plurality of rows and a plurality of columns, wherein each pixel of the plurality of pixels includes: a substrate; a composite layer including an absorption layer and a sensor array layer provided below the absorption layer, the sensor array layer including a plurality of temperature sensing cells, the composite layer having a pattern formed therein, and the pattern including at least one hole penetrating through the absorption layer; and a support separating the substrate from the composite layer.

The sensor array layer may further include an insulating layer around the plurality of temperature sensing cells and filling a region between the plurality of temperature sensing cells, and the at least one hole may pass through the insulating layer.

The at least one hole may include a plurality of holes provided at edge regions of the composite layer, and each hole of the plurality of holes has a rectangular cross-section.

According to an aspect of the disclosure, an electronic device includes: a thermal image sensor; and a processor configured to receive a sensing signal from the thermal image sensor and process the sensing signal, wherein the thermal image sensor includes: a substrate; a composite layer including an absorption layer and a sensor array layer provided below the absorption layer, the sensor array layer including a plurality of temperature sensing cells, the composite layer having a pattern formed therein, and the pattern including at least one hole penetrating through the absorption layer; and a support separating the substrate from the composite layer.

BRIEF DESCRIPTION OF DRAWINGS

The above and other aspects, features, and advantages of certain embodiments of the disclosure will be more apparent from the following description taken in conjunction with the accompanying drawings, in which:

FIG. 18 is a diagram of a thermal image sensor according to an embodiment;

DETAILED DESCRIPTION

Figure 1:
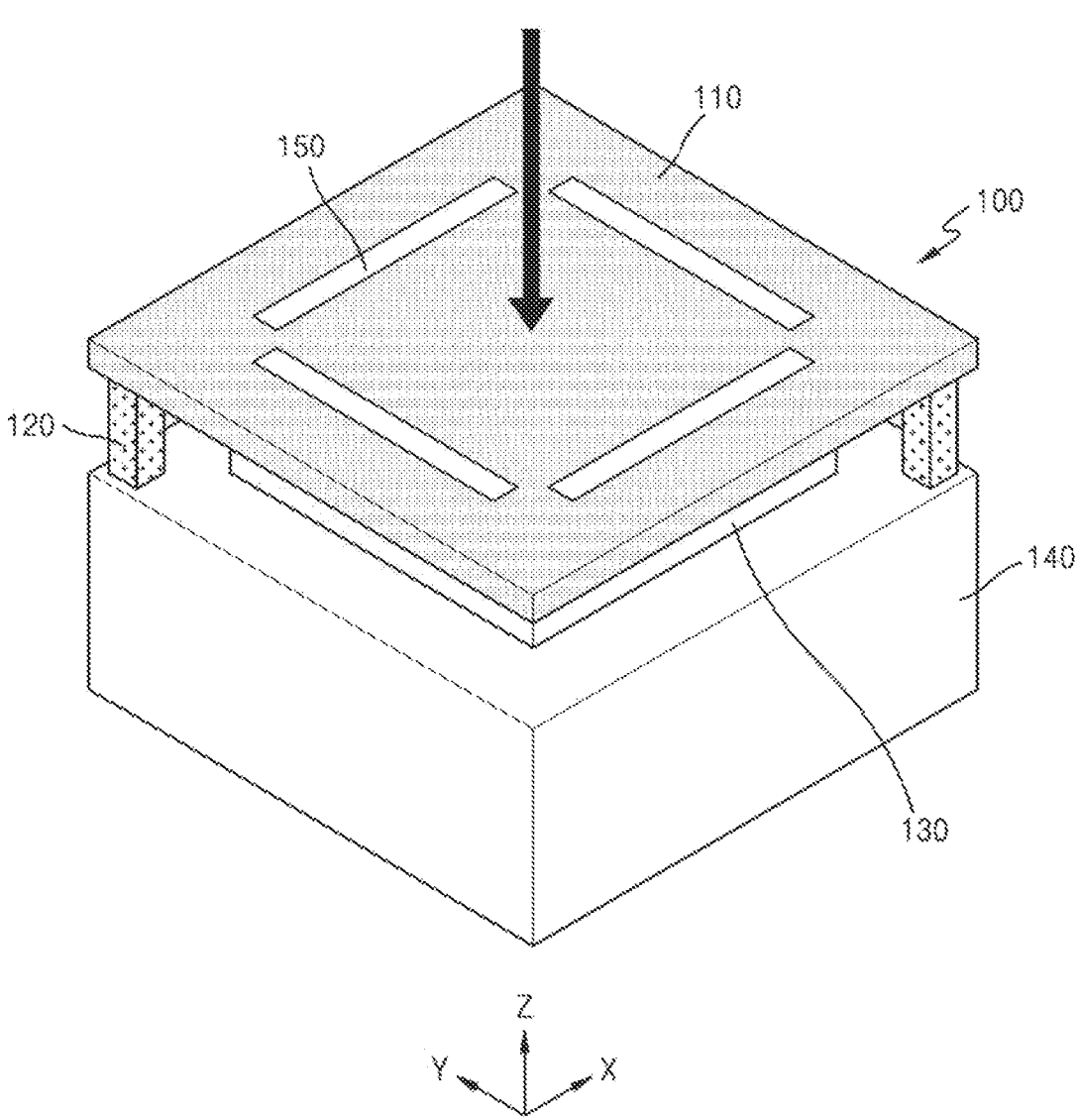
FIG. 1 is a diagram of a thermal image sensor according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, a thermal image sensor and an electronic device including the same will be described in detail with reference to the attached drawings. In the drawings, like reference numerals refer to like elements throughout and sizes of constituent elements may be exaggerated for convenience of explanation and the clarity of the specification. Also, embodiments described herein may have different forms and should not be construed as being limited to the descriptions set forth herein.

It will also be understood that when an element is referred to as being "on" or "above" another element, the element may be in direct contact with the other element or other intervening elements may be present. The singular forms include the plural forms unless the context clearly indicates otherwise. It should be understood that, when a part "comprises" or "includes" an element, unless otherwise defined, other elements are not excluded from the part and the part may further include other elements.

The use of the terms "a" and "an" and "the" and similar referents are to be construed to cover both the singular and the plural. The steps of all methods described herein can be performed in any suitable order unless otherwise indicated herein or otherwise clearly contradicted by context, and are not limited to the described order.

Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device.

The use of any and all examples, or exemplary language (e.g., "such as") provided herein, is intended merely to better illuminate the disclosure and does not pose a limitation on the scope of the disclosure unless otherwise claimed.

FIG. 1 is a diagram of a thermal image sensor 100 according to an embodiment.

Referring to FIG. 1, the thermal image sensor 100 may include a composite layer 110 including an absorption layer and a sensor array layer, a support 120, and a substrate 140.

The composite layer 110 may include the absorption layer and the sensor array layer arranged below the absorption layer. The absorption layer and the sensor array layer are described in detail later with reference to FIGS. 2A to 2C. The composite layer 110 may include a pattern 150. The composite layer 110 may have a width of about 8 micrometers (μm) to about 12 μm.

The support 120 may have a function of separating the substrate 140 apart from the composite layer 110. The support 120 may separate the substrate 140 apart from the composite layer 110 to insulate the composite layer 110 from the substrate 140. The support 120 may have a function of separating the substrate 140 apart from the composite layer 110 so that a resonant cavity is formed.

The thermal image sensor 100 may further include a reflective layer 130 disposed above the substrate 140. The reflective layer 130 may reflect light passing through the absorption layer to be described later and provide the reflected light to the absorption layer again. Accordingly, long-wavelength infrared absorption of the absorption layer may be increased. The reflective layer 130 may be spaced apart from the composite layer 110. The reflective layer 130 may include metal. For example, the reflective layer 130 may include at least one of titanium nitride (TiN), platinum (Pt), palladium (Pd), tungsten (W), titanium (Ti), aluminum (Al), nickel (Ni), molybdenum (Mo), copper (Cu), and gold (Au). However, according to necessity, the reflective layer 130 may not be provided.

The substrate 140 may include a semiconductor substrate on which electronic elements and wires are formed. For example, the substrate 140 may include silicon (Si), germanium (Ge), or silicon germanium (SiGe). The substrate 140 may include a readout integrated circuit (ROIC) substrate that controls the thermal image sensor 100. For example, the substrate 140 may include a timing controller 1010, a row decoder 1020, and an output circuit 1030, which are to be described later with reference to FIG. 14. The electronic elements and the wires may be configured to apply a reset signal or a readout signal to magnetoresistive elements to be described later, and transfer output signal generated from the magnetoresistive elements.

Figure 2A:
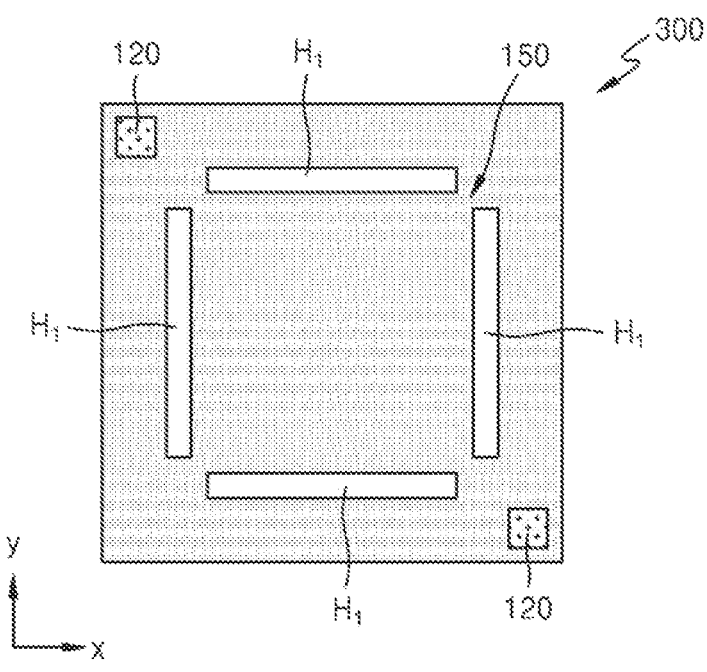
FIG. 2A is a diagram of an absorption layer according to an embodiment.

FIG. 2A is a diagram of an absorption layer 300 according to an embodiment.

Referring to FIG. 2A, the absorption layer 300 may include a pattern 150. The pattern 150 may be disposed at edge regions of the absorption layer 300. The pattern 150 may have one or more holes $H_1$ penetrating the absorption layer 300. The pattern 150 may increase the thermal resistance of the absorption layer 300 and limit a thermal conduction direction to a certain direction. When light is absorbed by the absorption layer 300, the light is converted into thermal energy, and a portion of the light increases temperature of a sensor array layer 200, and another portion of the light may escape to a substrate through the support 120. As thermal conduction occurs toward the support 120, when the pattern 150 is formed near the support 120, the thermal resistance increases and a temperature rise due to the thermal conduction increases, and accordingly, the sensor performance may be improved.

The absorption layer 300 may have a multi-layer structure. For example, the absorption layer 300 may include a NiCr layer, and a SiNx layer that are sequentially stacked along a direction perpendicular to an upper surface of the substrate 140. The absorber layer 300 may have a thickness of about 3 μm or more and about 5 μm or less. The thickness ratios of the NiCr layer, and the SiNx layer may be determined as needed.

Figure 2B:
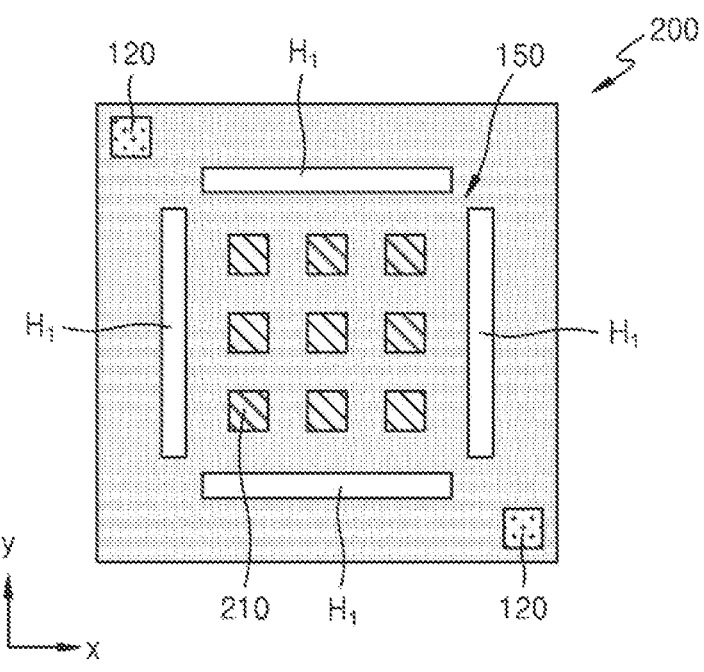
FIG. 2B is a cross-sectional view of a sensor array layer according to an embodiment.

FIG. 2B is a diagram of the sensor array layer 200 according to an embodiment.

Referring to FIG. 2B, the sensor array layer 200 may include a plurality of temperature sensing cells 210. Each temperature sensing cell 210 may include a magnetoresistive element.

The resistance of the temperature sensing cell 210 may change according to temperature. For example, as the temperature of the temperature sensing cell 210 increases, resistance of the temperature sensing cell 210 may decrease.

The temperature sensing cell 210 may have a width of 1 nanometer (nm) or more. When a width of the temperature sensing cell 210 is less than 1 nm, the inherent properties of a material thereof may be lost, and process difficulty may increase. For example, the width of the temperature sensing cell 210 may be greater than or equal to about 10 nm and less than or equal to about 100 nm.

The area of each temperature sensing cell 210 may be 100 nm×100 nm or less. When the area of the temperature sensing cell 210 is greater than 100 nm×100 nm, a magnitude of a detection current passing through the temperature sensing cell 210 may increase, which may generate Joule heat in the temperature sensing cell 210. Joule heat generated in the temperature sensing cell 210 may be a factor that lowers the sensing accuracy of the thermal image sensor 100. When the area of the temperature sensing cell 210 is greater than 100 nm×100 nm, it may be difficult to control Joule heat generated from the temperature sensing cell 210.

The sensor array layer 200 may further include an insulating layer 240 surrounding the plurality of temperature sensing cells 210 while filling a region between the plurality of temperature sensing cells 210. One or more holes penetrating the absorption layer 300 may extend to pass through the insulating layer 240.

Figure 2C:
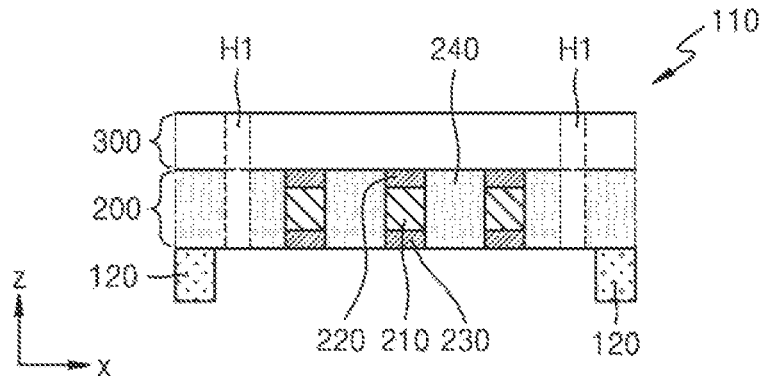
FIG. 2C is a cross-sectional view of a composite layer according to an embodiment.

FIG. 2C is a cross-sectional view of the composite layer 110 according to an embodiment.

Referring to FIG. 2C, the composite layer 110 may include the absorption layer 300 and the sensor array layer 200 arranged below the absorption layer 300. The composite layer 110 may have the pattern 150 having one or more holes $H_1$ penetrating the absorption layer 300 and the sensor array layer 200. The pattern 150 may increase the thermal resistance of the absorption layer 300 and limit a thermal conduction direction to a certain direction.

The sensor array layer 200 may include the plurality of temperature sensing cells 210, an upper electrode 220, and a lower electrode 230. The upper electrode 220, the temperature sensing cells 210, and the lower electrode 230 may be sequentially arranged along a direction from the absorption layer 300 toward a substrate.

The absorption layer 300 may be disposed over the sensor array layer 200. The absorption layer 300 may absorb light and generate heat. For example, the absorption layer 300 may generate heat by selectively absorbing long-wavelength infrared rays. Heat generated by the absorption layer 300 may vary according to the intensity of long-wavelength infrared rays. Heat generated by the absorption layer 300 may be transferred to the temperature sensing cells 210. Accordingly, the temperature of the temperature sensing cells 210 may increase.

Figure 3:
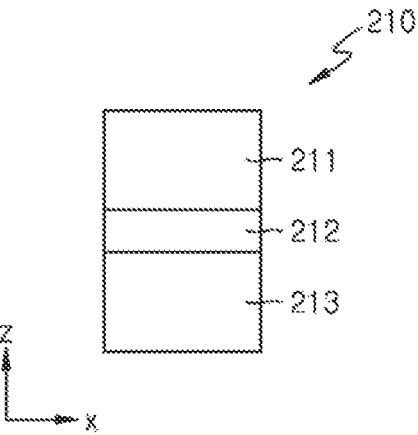
FIG. 3 is a cross-sectional view of a magnetoresistive element according to an embodiment.

FIG. 3 is a cross-sectional view of the temperature sensing cell 210 according to an embodiment.

The temperature sensing cell 210 may include a magnetoresistive element. The temperature sensing cell 210 may include a first magnetic layer 211, a second magnetic layer 213 on the first magnetic layer, and a tunneling barrier layer 212 between the first magnetic layer 211 and the second magnetic layer 213. The first magnetic layer 211, the second magnetic layer 213, and the tunneling barrier layer 212 may be referred to as a magnetic tunnel junction (MTJ). The first magnetic layer 211, the second magnetic layer 213, and the tunneling barrier layer 212 may be arranged along a z-direction. For example, the z-direction may be a direction perpendicular to the upper surface of the substrate 140. The first magnetic layer 211 and the second magnetic layer 213 may have a horizontal magnetization direction or a perpendicular magnetization direction. The horizontal magnetization direction may refer to a magnetization direction parallel to the upper surface of the substrate 140. The perpendicular magnetization direction may refer to a magnetization direction perpendicular to the upper surface of the substrate 140. The first magnetic layer 211 may include a pinned layer having a fixed magnetization direction. The second magnetic layer 213 may include a free layer having a magnetization direction that is changeable to a direction parallel or anti-parallel to a magnetization direction of the first magnetic layer 211. A state in which the magnetization direction of the second magnetic layer 213 is parallel to and anti-parallel to that of the first magnetic layer 211 may be referred to as a 'parallel state' and an 'anti-parallel state', respectively.

The first magnetic layer 211 may have a horizontal magnetization direction fixed to one direction parallel to the upper surface of the substrate 140. For example, the first magnetic layer 211 may have a magnetization direction fixed in an x-direction. The first magnetic layer 211 may include a ferromagnetic material. For example, the first magnetic layer 211 may include at least one of Fe alloy, Co alloy, or Ni alloy, which are magnetic. For example, the first magnetic layer 211 may include at least one of cobalt iron boron (CoFeB), cobalt iron (CoFe), nickel iron (NiFe), cobalt iron platinum (CoFePt), cobalt iron palladium (CoFePd), and cobalt iron chrome (CoFeCr), cobalt iron terbium (CoFeTb), cobalt iron gadolinium (CoFeGd), and cobalt iron nickel (CoFeNi). For example, a thickness of the first magnetic layer 211 may be 1 micrometer (μm) or less.

The first magnetic layer 211 may have a perpendicular magnetization direction fixed to one direction perpendicular to the upper surface of the substrate 140. For example, the first magnetic layer 211 may have a magnetization direction fixed in the z-direction. The first magnetic layer 211 may include at least one of a perpendicular magnetic material (e.g., CoFeTb, CoFeGd, CoFeDy), a CoPt alloy having a hexagonal close packed lattice structure, and a perpendicular magnetic structure. The perpendicular magnetic structure may include magnetic patterns and non-magnetic patterns that are alternately and repeatedly stacked. For example, the perpendicular magnetic structure may include a (Co/Pt)n stacked structure, a (CoFe/Pt)n stacked structure, a (CoFe/Pd)n stacked structure, a (Co/Pd)n stacked structure, a (Co/N)n stacked structure, a (Co/Ni)n stacked structure, a (CoNi/Pt)n stacked structure, a (CoCr/Pt)n stacked structure, a (CoCr/Pd)n stacked structure (where n is a natural number), or a combination thereof. For example, the thickness of the first magnetic layer 211 may be 1 μm or less.

The second magnetic layer 213 may be provided on the first magnetic layer 211. The second magnetic layer 213 may have a magnetization direction that is changeable according to temperature. When the first magnetic layer 211 has a horizontal magnetization direction, the second magnetic layer 213 may have a magnetization direction parallel to the upper surface of the substrate 140. When the second magnetic layer 213 has a perpendicular magnetization direction, the second magnetic layer 213 may have a magnetization direction perpendicular to the upper surface of the substrate 140. The second magnetic layer 213 may include at least one of Fe alloy, Co alloy, or Ni alloy, which are magnetic. For example, the second magnetic layer 213 may include at least one of cobalt iron boron (CoFeB), cobalt iron (CoFe), nickel iron (NiFe), cobalt iron platinum (CoFePt), cobalt iron palladium (CoFePd), cobalt iron chrome (CoFeCr), cobalt iron terbium (CoFeTb), cobalt iron gadolinium (CoFeGd), and cobalt iron nickel (CoFeNi). For example, a thickness of the second magnetic layer 213 may be 1 μm or less.

The tunneling barrier layer 212 may be between the first magnetic layer 211 and the second magnetic layer 213. The tunneling barrier layer 212 may include a non-magnetic material. For example, the tunneling barrier layer 212 may include at least one of a metal oxide (for example, aluminum oxide, magnesium oxide, titanium oxide, magnesium-zinc oxide, magnesium-boron oxide) graphene, and a non-magnetic metal material (for example, copper (Cu), ruthenium (Ru), or tantalum (Ta)). In an embodiment, the first magnetic layer 211, the tunneling barrier layer 212, and the second magnetic layer 213 may include a CoFeB layer, an MgO layer, and a CoFeB layer, respectively. A thickness of the tunneling barrier layer 212 may be determined such that heat remains in the temperature sensing cell 210 sufficiently while electrons are able to tunnel through the tunneling barrier layer 212. The thickness of the tunneling barrier layer 212 may be 100 nm or less. For example, the tunneling barrier layer 212 may have a thickness of about 1 nm to about 10 nm. When the thickness of the tunneling barrier layer 212 is too small, heat may not stay in the temperature sensing cell 210 for a required amount of time. When the tunneling barrier layer 212 is too great, it may be difficult for electrons to tunnel through the tunneling barrier layer 212.

FIGS. 4, 5, 6, 7, 8 and 9 are diagrams of the pattern 150 according to various embodiments.

Figure 4:
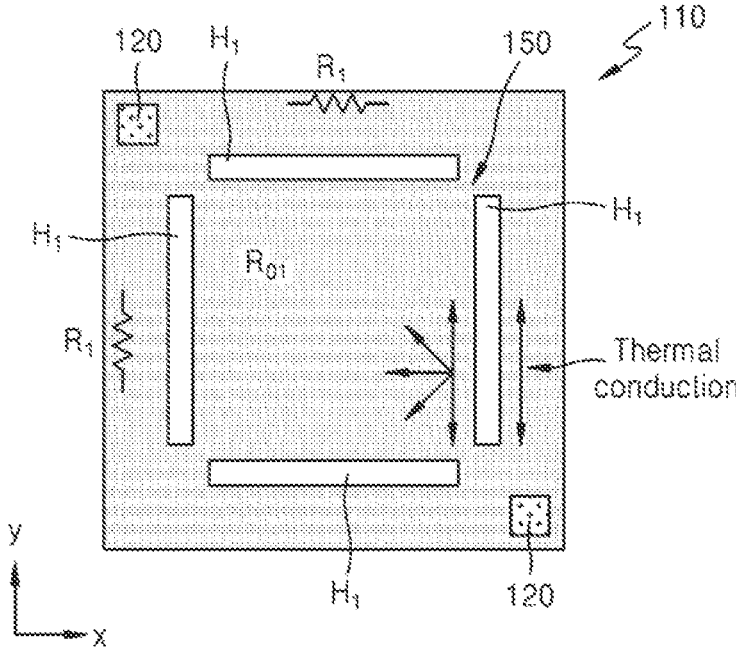
FIGS. 4, 5, 6, 7, 8 and 9 are diagrams of patterns according to various embodiments.

Referring to FIG. 4, the pattern 150 may include holes $H_1$ arranged at edge regions of the composite layer 110 and have a rectangular cross-section. For example, four holes $H_1$ having a rectangular cross-section may be arranged in parallel with the edge regions of the composite layer 110. When the pattern 150 is not applied, thermal resistance R on a plane may be expressed as follows in Equation (1).

$$R \approx \frac{R_{anchor}}{2} + R_0 \qquad (1)$$

$R_{anchor}$ denotes resistance of the support 120, and $R_0$ denotes resistance of an absorption layer plane when there is no pattern. When the pattern 150 is applied, due to the thermal resistance between the pattern 150 and the edge regions of the composite layer 110, the thermal resistance in a plane direction increases, and the thermal resistance R may be expressed as follows in Equation (2).

$$R \approx \frac{R_{anchor} + \frac{R_1}{2}}{2} + R_{01} \qquad (2)$$

$R_{anchor}$ denotes the resistance of the support 120, and $R_1$ denotes the resistance between the pattern 150 and the edge regions of the composite layer 110, and $R_{01}$ denotes the resistance of an absorption layer plane surrounding by the holes $H_1$ which have a rectangular shape. In addition, when the pattern 150 is not applied, heat absorbed by an absorption layer and then converted into thermal energy may be transmitted in all directions. However, when the pattern 150 is applied, due to the pattern 150, insulation effects may be generated, and a thermal conduction direction may be limited to the direction of the arrow. As a result, a thermal conduction distance is increased, and the thermal resistance in a plane direction is increased during thermal conduction, and accordingly, the range of a temperature rise due to thermal conduction may be increased.

Figure 5:
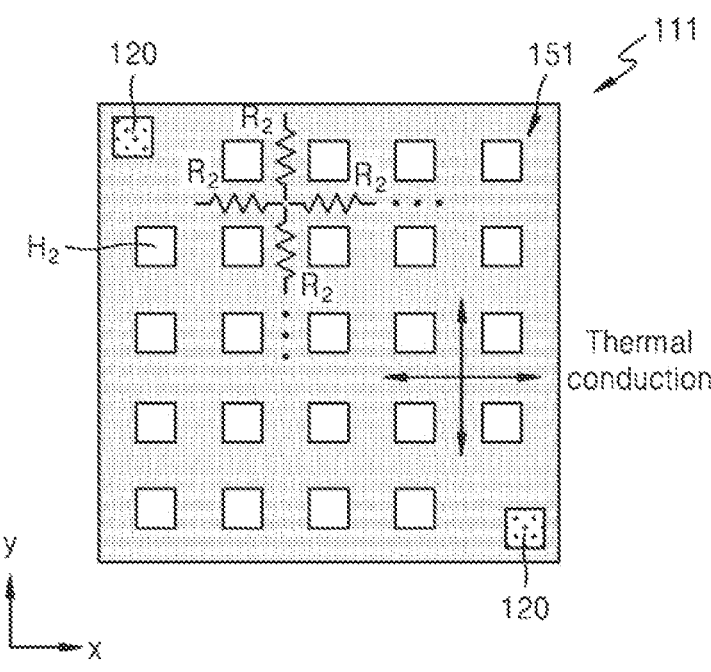

Referring to FIG. 5, a pattern 151 may include a plurality of holes $H_2$ having a square cross-section. The plurality of holes $H_2$ may be disposed over the entire composite layer 111. For example, the plurality of holes $H_2$ may be spaced apart at equal intervals. When the pattern 151 is applied at intervals, the thermal resistance in a plane direction increases during thermal conduction due to the thermal resistance between the respective holes constituting the pattern 151, and the thermal resistance R may be expressed as follows in Equation (3).

$$R \approx \frac{R_{anchor}}{2} + a \cdot R_0 \left( 1 - \frac{n \cdot R_2}{R_0} \right)^{-1} \qquad (3)$$

$R_{anchor}$ denotes resistance of the support 120, $R_2$ denotes resistance between holes forming the pattern 151, and $R_0$ denotes resistance of an absorption layer plane when there is no pattern. In addition, when the pattern 151 is not applied, heat absorbed by an absorption layer and then converted into thermal energy may be transmitted in all directions. However, when the pattern 151 is applied, due to the pattern 151, insulation effects may be generated, and a thermal conduction direction may be limited to the direction of the arrow. As a result, a thermal conduction distance is increased, and the thermal resistance in the plane direction is increased during thermal conduction, and accordingly, the range of a temperature rise due to thermal conduction may be increased.

Figure 6:
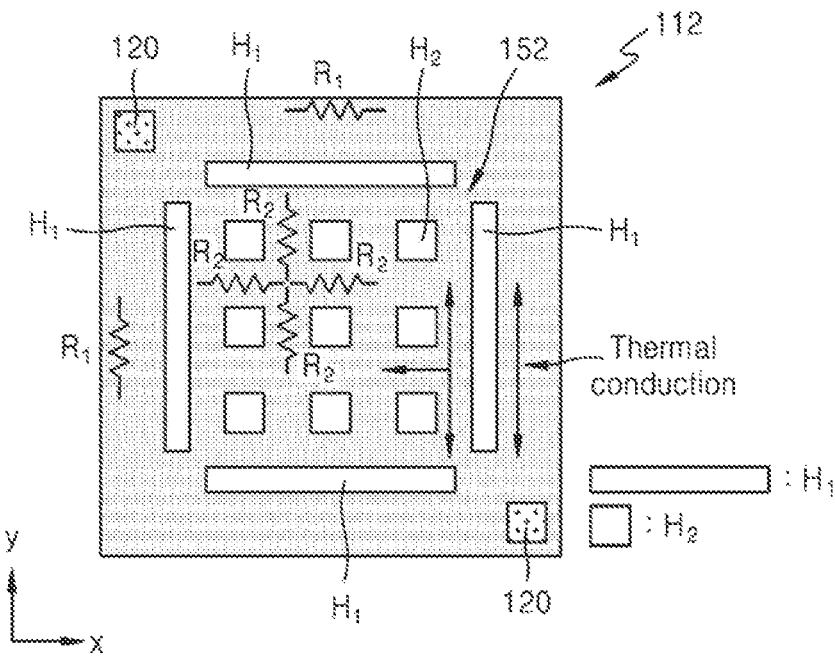

Referring to FIG. 6, a pattern 152 may include a plurality of holes $H_1$ and $H_2$ having different cross-sectional shapes. The holes $H_1$ having a rectangular cross-section may be disposed at edge regions of a composite layer 112, and the holes $H_2$ having a square cross-section may be disposed in a center of the composite layer 112. When the pattern 152 is applied, thermal resistance R may be expressed as follows in Equation (4).

$$R \approx \frac{R_{anchor} + \frac{R_1}{2}}{2} + a \cdot R_{01} \left( 1 - \frac{n \cdot R_2}{R_{01}} \right)^{-1} \tag{4}$$

$R_{anchor}$ denotes resistance of the support 120, $R_1$ denotes the resistance between the pattern 150 and the edge regions of the composite layer 112, $R_2$ denotes resistance between holes forming the pattern 151, and $R_{01}$ denotes resistance of an absorption layer plane surrounding by the hole $H_1$ having a rectangular shape. In addition, when the patterns 150 and 151 are not applied, heat absorbed by an absorption layer and then converted into thermal energy may be transmitted in all directions. However, when the patterns 150 and 151 are applied, due to the patterns 150 and 151, insulation effects may be generated, and a thermal conduction direction may be limited to the direction of the arrow.

Figure 7:
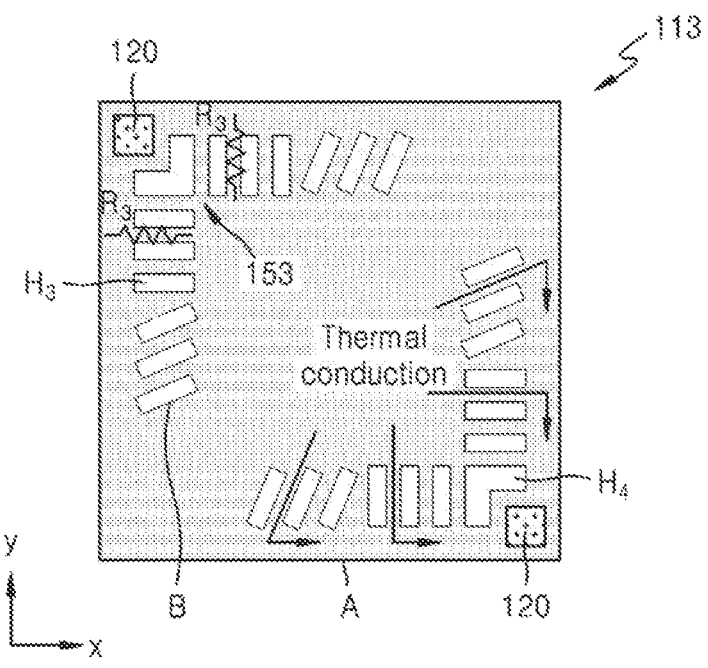

Referring to FIG. 7, a pattern 153 may include a plurality of holes $H_3$ and $H_4$ having different cross-sectional shapes. The holes $H_3$ having a rectangular cross-section may be arranged in a periphery of a composite layer 113, and the holes $H_4$ may be arranged in a periphery of the support 120. In the holes $H_3$ having a rectangular cross-section, a long side B of the cross-section may be arranged at a different angle from a reference axis (e.g., X-axis). For example, the reference axis may be parallel to one side A of the composite layer 113. In the holes $H_3$ having a rectangular cross-section, the long side B of the cross-section may be perpendicular to the reference axis (e.g., X-axis). The holes $H_3$ having a rectangular cross-section may be formed such that the long side B of the cross-section forms an angle greater than about 0° and smaller than about 90° with respect to the reference axis (e.g., X-axis). The angle refers to an angle at which the long side B of the cross-section of the holes $H_3$ having a rectangular cross-section is rotated counterclockwise with respect to one side A of the composite layer 113. In addition, when the pattern 153 is not applied, heat absorbed by an absorption layer and then converted into thermal energy may be transmitted in all directions. However, when the pattern 153 is applied, insulation effects may be generated, and a thermal conduction direction may be limited to the direction of the arrow. When the pattern 153 is applied, a thermal conduction distance may increase, and thus thermal resistance may increase.

Figure 8:
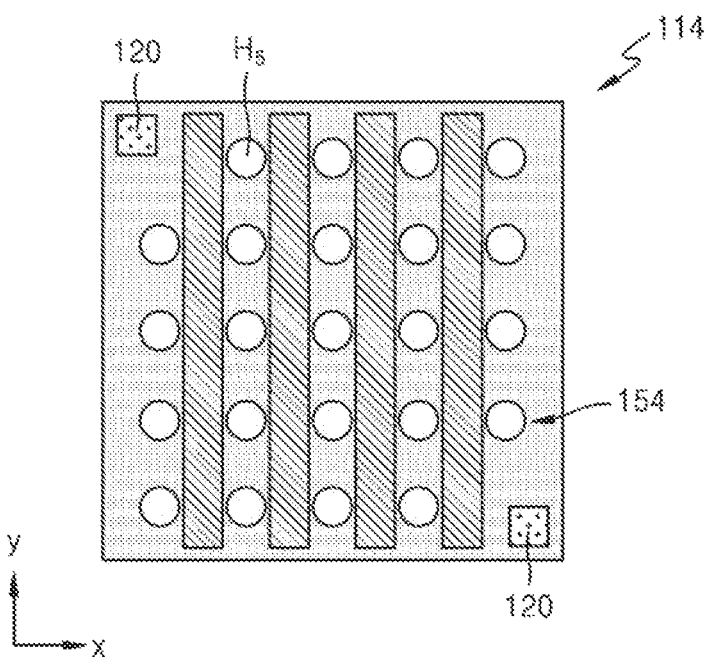

Referring to FIG. 8, a pattern 154 may include a plurality of holes $H_5$ having a circular cross-section. However, the disclosure is not limited thereto, and the cross-sectional shape of the holes $H_5$ constituting the pattern 154 may be any one of a circle, a triangle, a rectangle, and an ellipse, and a plurality of holes having different cross-sectional shapes may form one pattern.

Figure 9:
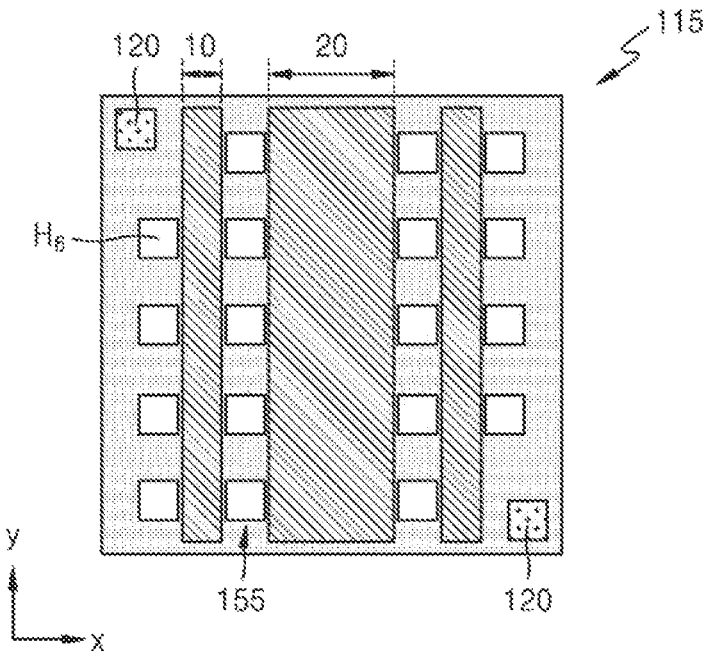

Referring to FIG. 9, holes $H_6$ constituting a pattern 155 may be spaced apart at different intervals. For example, a distance 20 between holes disposed at a center of a composite layer 115 among the holes $H_6$ constituting the pattern 155 may be wider than a distance 10 between holes disposed at the edge regions of the composite layer 115. However, the disclosure is not limited thereto, and as illustrated in FIGS. 4 to 8, the holes $H_6$ constituting the pattern 155 may be spaced apart at equal intervals.

By applying the patterns 150, 151, 152, 153, 154, and 155 to a thermal image sensor to increase thermal resistance and adjusting a thermal conduction direction to increase a thermal conduction distance, an attainable temperature of the thermal image sensor may be increased.

Figure 10:
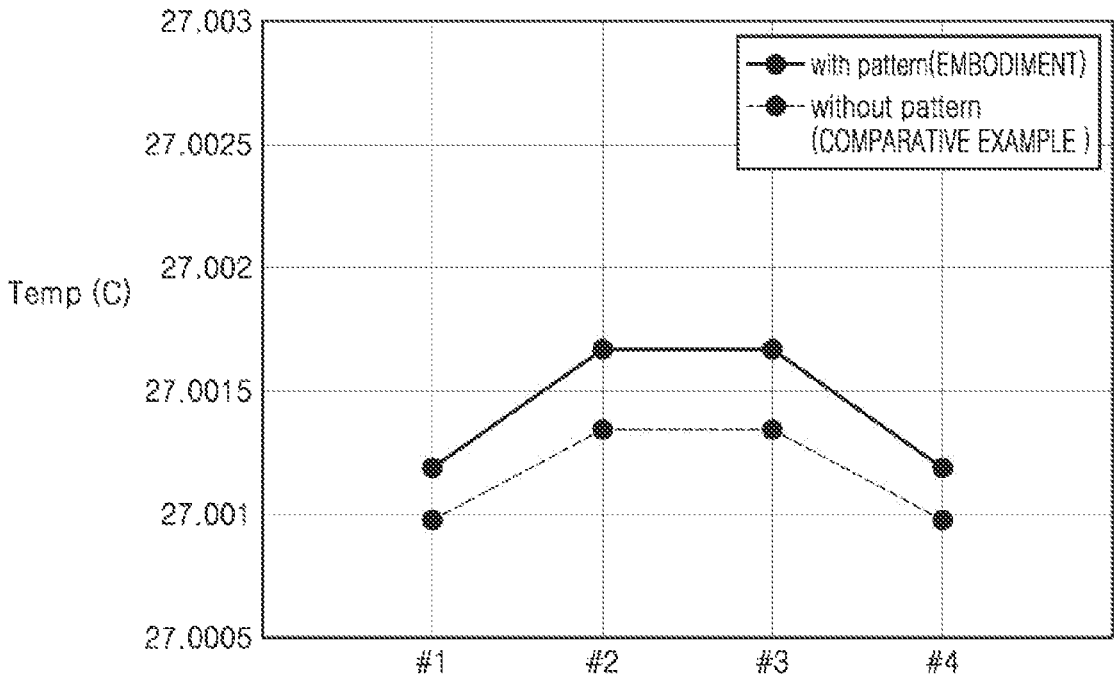
FIG. 10 is a graph showing an attainable temperature of a temperature sensing unit according to an embodiment.

FIG. 10 is a graph showing an attainable temperature of a temperature sensing unit according to an embodiment. FIG. 10 shows results with a pattern according to embodiments and without a pattern according to a comparative example.

Referring to FIG. 10, an attainable temperature of a sensor array layer is shown, in which the absorption according to a position of an absorption layer in a thermal simulation (Comsol) is reflected. With a pattern, the attainable temperature of the sensor array layer may be higher than without a pattern. With a pattern, as an amount of temperature change may be increased in a temperature sensing cell of a sensor array layer, a range of resistance values that may be sensed may be increased.

Figure 11:
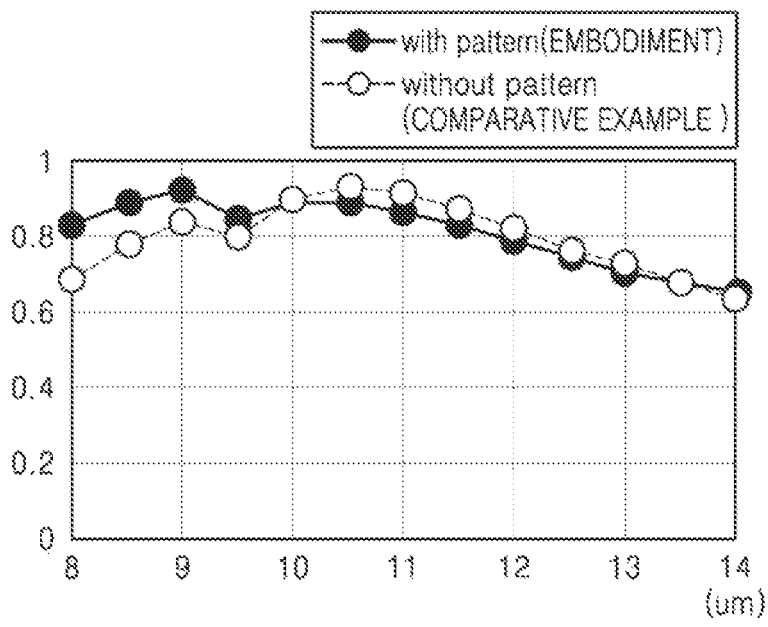
FIG. 11 is a graph showing light absorbance according to a wavelength range of the absorption layer according to an embodiment.

FIG. 11 is a graph showing light absorbance according to a wavelength range of an absorption layer according to an embodiment. FIG. 11 shows results with a pattern according to embodiments and without a pattern according to a comparative example.

Referring to FIG. 11, light absorbance of the absorption layer in a wavelength range of about 8 μm to about 14 μm is shown. With a pattern, the absorbance increases in a range of about 8 μm to about 10 μm than without a pattern, and then decreases in a range of about 10 μm to about 14 μm, and increases in the entire wavelength range. When the absorbance is increased by applying a pattern, the energy that is convertible into heat may be increased and the amount of temperature change may be increased, and accordingly, the attainable temperature of the thermal image sensor may be increased.

Figure 12:
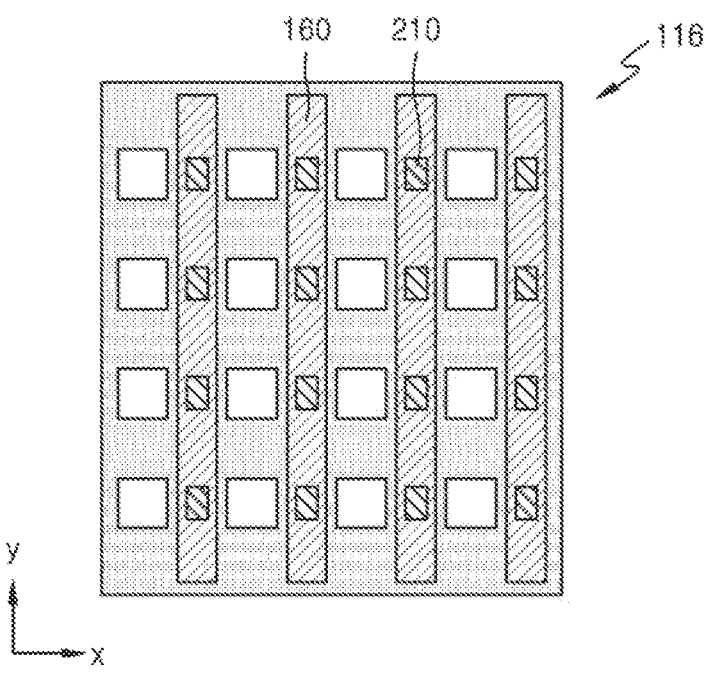
FIGS. 12 and 13 are diagrams of a composite layer according to an embodiment.
Figure 13:
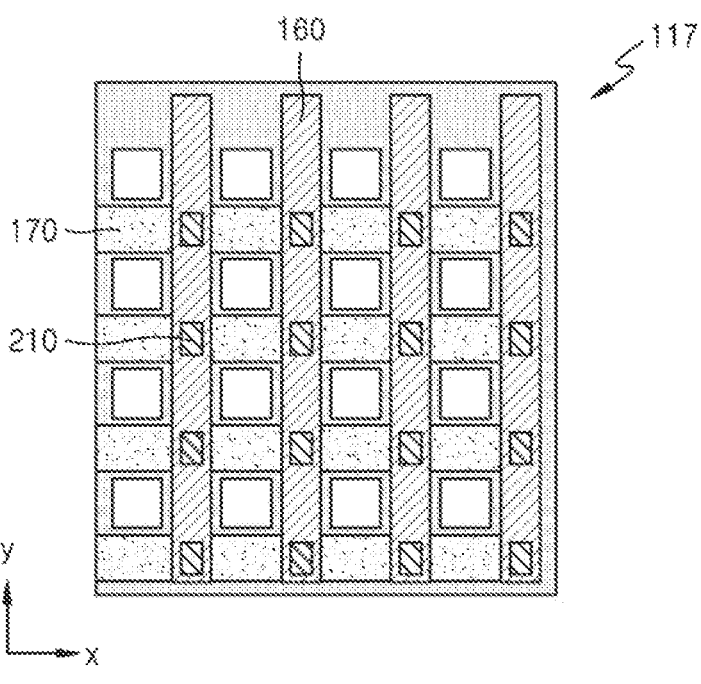

FIGS. 12 and 13 are diagrams of a composite layer according to an embodiment.

Referring to FIG. 12, a composite layer 116 may include a first wire 160 arranged between patterns in parallel with a y-direction. The first wire 160 may connect the temperature sensing cells 210 to one another in series.

Referring to FIG. 13, a composite layer 117 may include, between patterns, the first wire 160 arranged in parallel to the y-direction and a second wire 170 arranged in parallel to the x-direction. The first wire 160 and the second wire 170 may connect the temperature sensing cells 210 in parallel to each other.

When the temperature sensing cells 210 are connected in series, a temperature change of the plurality of temperature sensing cells 210 may be sensed using a single channel, and when the temperature sensing cells 210 are connected in parallel, temperature changes of the plurality of temperature sensing cells 210 may be sensed by using row and column wires.

FIGS. 14, 15, 16 and 17 illustrate a thermal image sensor package according to various embodiments.

Figure 14:
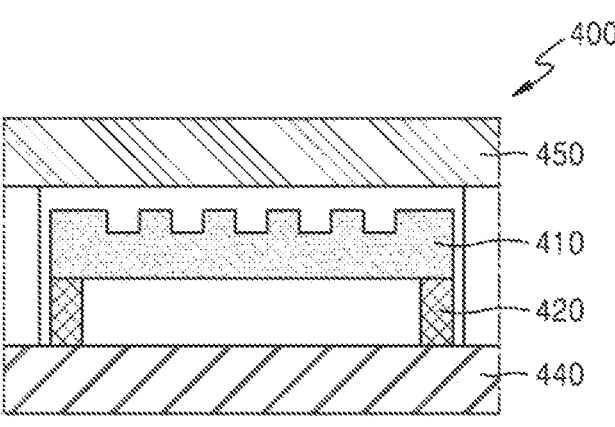
FIGS. 14, 15, 16 and 17 are diagrams of a thermal image sensor package according to various embodiments.

Referring to FIG. 14, a thermal image sensor package 400 may be provided. The thermal image sensor package 400 may include a composite layer 410, a support 420, and an ROIC substrate 440. Although an ROIC substrate is depicted as substrate 440, other types of substrates may be utilized as will be understood by one of ordinary skill of art from the disclosure herein. The composite layer 410 may have a pattern. In the thermal image sensor package 400, a transmission cap 450 may be provided on the ROIC substrate 440 of the thermal image sensor. An inner region surrounded by the transmission cap 450 and the ROIC substrate 440 may be defined. For example, the inner region may be sealed by the transmission cap 450 and the ROIC substrate 440. An atmospheric pressure of the inner region may be lower than that of the outside of the transmission cap 450. For example, the inner region may have a substantially vacuum state. The composite layer 410 including an absorption layer and a temperature sensing layer, and the support 420 may be provided in the inner region. The transmission cap 450 may be arranged to cover the composite layer 410 and the support 420. The transmission cap 450 may be spaced apart from the composite layer 410 and the support 420. The transmission cap 450 may be arranged to selectively transmit long-wave infrared rays among incident light incident on the transmission cap 450. That is, the transmission cap 450 may receive incident light and emit long-wave infrared rays to the inner region. The transmission cap 450 may include a material or structure that selectively transmits long-wave infrared rays. For example, the transmission cap 450 may include $CaF_2$, Si, Ge, GaAs, KRS-5, ZnS, ZnSe, $BaF_2$, or infrared (IR) polymer. The transmission cap 450 may be spaced apart from the composite layer 410 by about 100 nm to about 2 μm.

Figure 15:
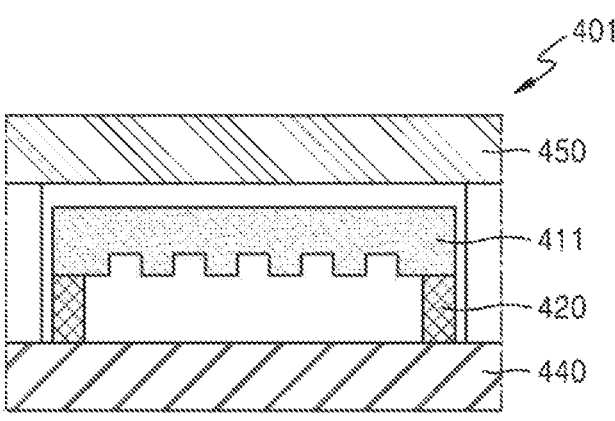

Referring to FIG. 15, a thermal image sensor package 401 may be provided. The thermal image sensor package 401 may include a composite layer 411, the support 420, and the ROIC substrate 440. In the thermal image sensor package 401, the transmission cap 450 may be provided on the ROIC substrate 440 of a thermal image sensor. The thermal image sensor package 401 may be the same as the thermal image sensor package 400 of FIG. 14 except that a pattern is arranged below the composite layer 411.

Figure 16:
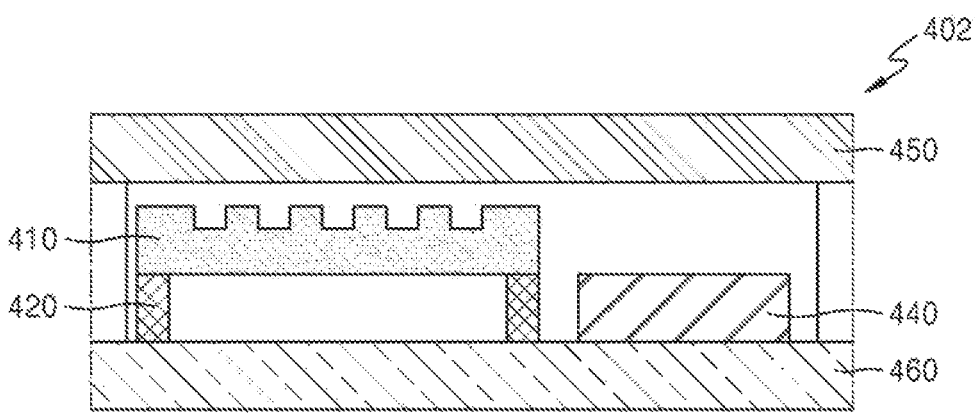

Referring to FIG. 16, a thermal image sensor package 402 may be provided. The thermal image sensor package 402 may include the composite layer 410, the support 420, the ROIC substrate 440, and a base 460. The composite layer 410 may have a pattern. The base 460 may include a package substrate including a plurality of wires. For example, the base 460 may include a printed circuit board (PCB). In an example, a processor for controlling a sensor may be arranged on the base 460, and wires may electrically connect the sensor to the processor. In an example, a processor controlling the sensor is provided externally, and wires may electrically connect the sensor to the external processor.

In the thermal imaging sensor package 402, the transmission cap 450 may be provided on the ROIC substrate 440 of a thermal imaging sensor. An inner region surrounded by the transmission cap 450 and the base 460 may be defined. The transmission cap 450 may be the same as the transmission cap 450 described in FIG. 14.

Figure 17:
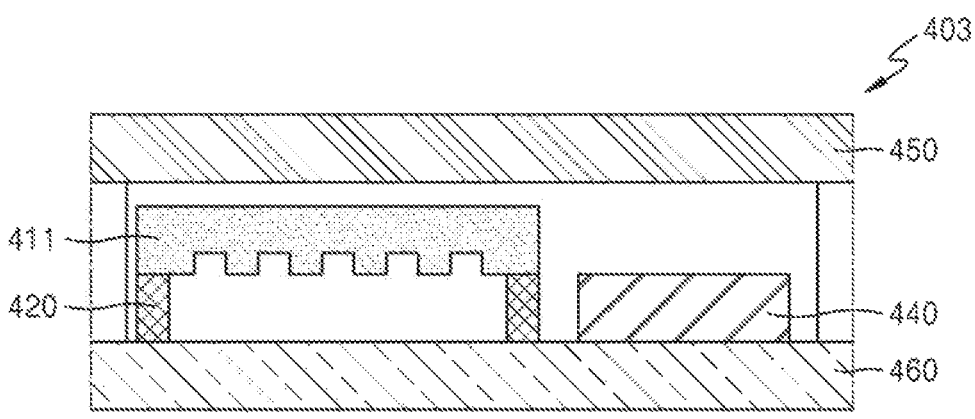

Referring to FIG. 17, a thermal image sensor package 403 may be provided. The thermal image sensor package 403 may include the composite layer 411, the support 420, the ROIC substrate 440, and the base 460. In the thermal image sensor package 401, the transmission cap 450 may be provided on the ROIC substrate 440 of a thermal image sensor. The thermal image sensor package 403 may be the same as the thermal image sensor package 402 of FIG. 16 except that the pattern is arranged below the composite layer 411.

Figure 18:
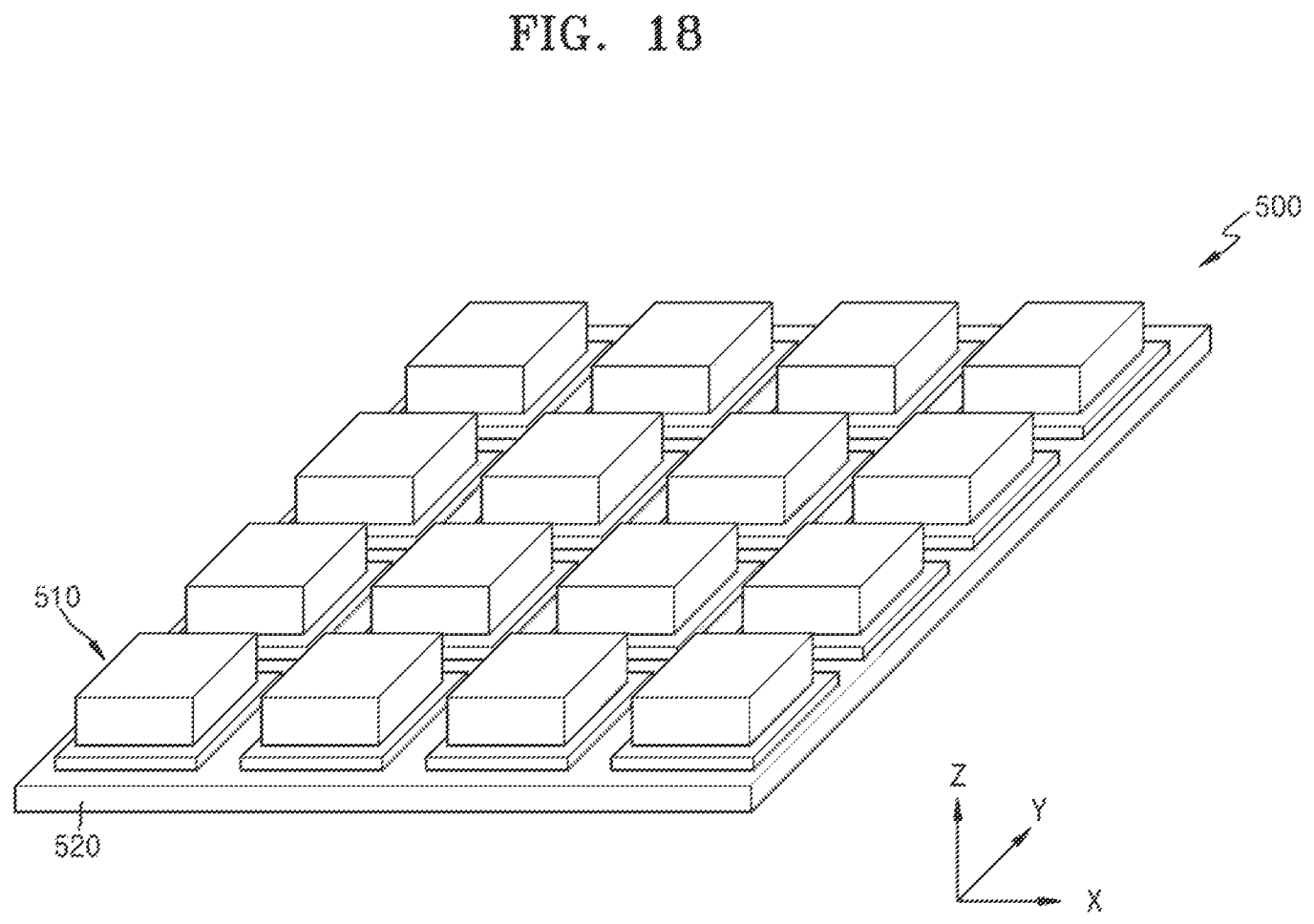

FIG. 18 is a diagram of a thermal image sensor according to an embodiment.

Referring to FIG. 18, a thermal image sensor 500 may be provided. The thermal image sensor 500 may include a base 520 and a plurality of sensors 510. The base 520 may include a package substrate including a plurality of wires. For example, the base 520 may include a PCB. A processor for controlling the plurality of sensors 510 may be arranged on the base 520, and a plurality of wires may electrically connect the plurality of sensors 510 to a processor. The processor controlling the plurality of sensors 510 may be provided outside the thermal image sensor 500, and a plurality of wires may electrically connect the plurality of sensors 510 to a processor outside the thermal image sensor 500.

The plurality of sensors 510 may be two-dimensionally arranged on the base 520. For example, the plurality of sensors 510 may be arranged along the x-direction and the y-direction. Each of the plurality of sensors 510 may be substantially the same as the thermal image sensor 100 described above. A plurality of solders may be provided between the plurality of sensors 510 and the base 520 to electrically connect wires of the plurality of sensors 510 to the base 520, and connect the plurality of sensors 510 to the base 520. The plurality of sensors 510 may be individually controlled, and signals generated by the plurality of sensors 510 may be individually measured.

Figure 19:
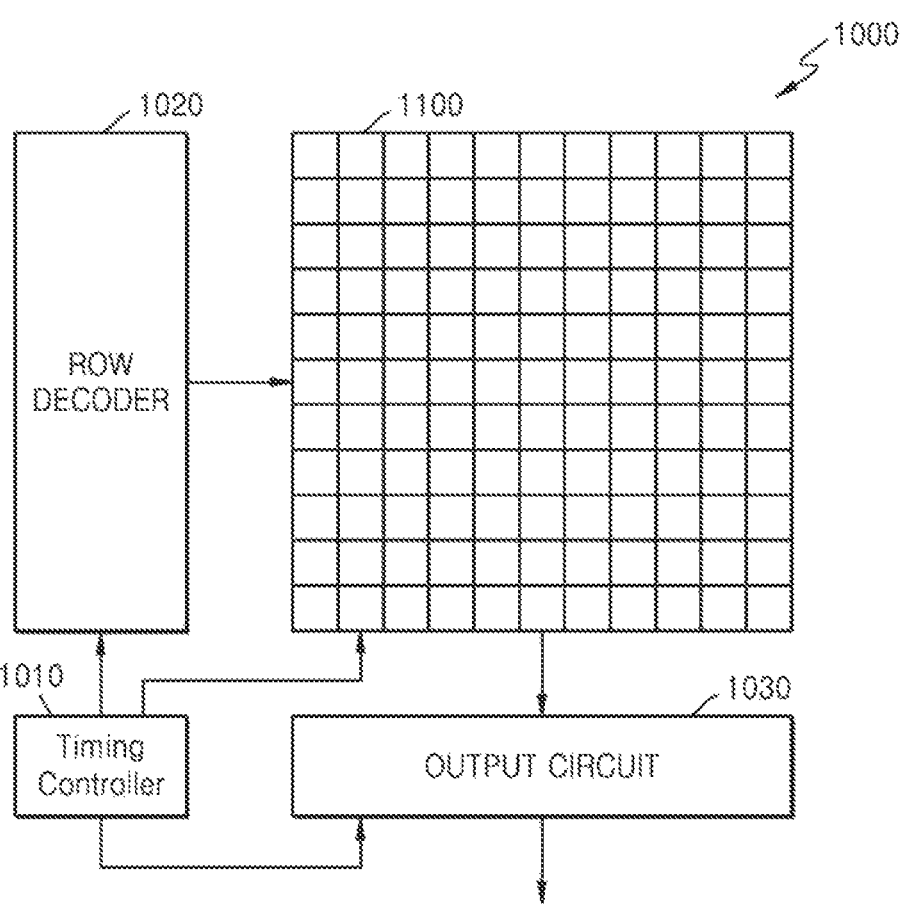
FIG. 19 is a diagram of a thermal image sensor according to an embodiment.

FIG. 19 is a diagram of a thermal image sensor 1000 according to an embodiment.

Referring to FIG. 19, the thermal image sensor 1000 may include a pixel array 1100, a timing controller 1010, a row decoder 1020, and an output circuit 1030. The pixel array 1100 may include a plurality of pixels two-dimensionally arranged along a plurality of rows and a plurality of columns. Each of the plurality of pixels may include the thermal image sensor 1000 described above. As the thermal image sensor 1000 includes a magnetoresistive element, a plurality of pixels may have a compact size. An arrangement of the plurality of pixels may be implemented in various ways.

The row decoder 1020 selects one of rows of the pixel array 1100 in response to a row address signal output from the timing controller 1010. The row decoder 1020 may transmit a readout signal and a reset signal for resetting the selected row, to the selected row. The output circuit 1030 outputs sensing signals in units of columns from the pixel array 1100 arranged along the selected row. To this end, the output circuit 1030 may include a column decoder, an integrator, and an analog to digital converter (ADC). The timing controller 1010, the row decoder 1020, and the output circuit 1030 may be implemented as a single chip or separate chips. A processor for processing an image signal output through the output circuit 1030 may be implemented as a single chip together with the timing controller 1010, the row decoder 1020, and the output circuit 1030. The processor may receive a detection signal from the thermal image sensor 1000 and process the detection signal.

Figure 20:
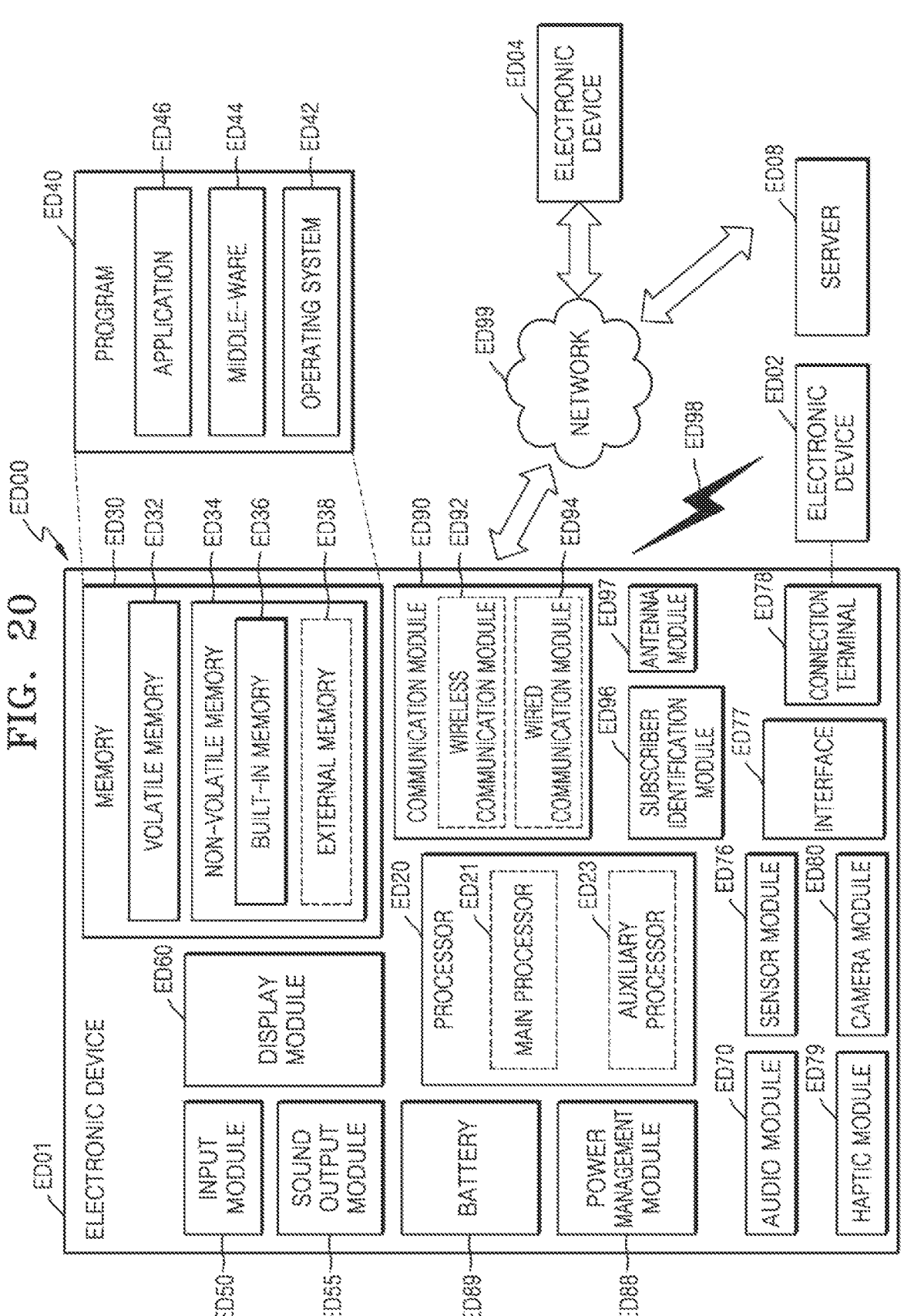
FIG. 20 is a diagram of an electronic device including a thermal image sensor, according to an embodiment.

FIG. 20 is a diagram of an electronic device including a thermal image sensor, according to an embodiment.

Referring to FIG. 20, in a network environment ED00, an electronic device ED01 may communicate with another electronic device ED02 through a first network ED98 (e.g., a short-distance wireless communication network) or may communicate with another electronic device ED04 and/or a server ED08 through a second network ED99 (e.g., a long-distance wireless communication network). The electronic device ED01 may communicate with the electronic device ED04 through the server ED08. The electronic device ED01 may include a processor ED20, a memory ED30, an input device ED50, a sound output device ED55, a display device ED60, an audio module ED70, a sensor module ED76, an interface ED77, a haptic module ED79, a camera module ED80, a power management module ED88, a battery ED89, a communication module ED90, a subscriber identification module ED96, and/or an antenna module ED97. In the electronic device ED01, some of these components (such as the display device ED60) may be omitted or other components may be added. Some of these components may be implemented as a single integrated circuit. For example, the sensor module ED76 may be embedded in the display device ED60 (e.g., a display).

The processor ED20 may control, by executing software (e.g., the program ED40), to control one or a plurality of other components (e.g., hardware, software components) of the electronic device ED01 connected to the processor ED20, and may perform various data processing or calculations. As part of data processing or calculation, the processor ED20 may load commands and/or data received from other components (e.g., the sensor module ED76, the communication module ED90) into a volatile memory ED32, and may process the commands and/or data stored in the volatile memory ED32 and store resultant data in a nonvolatile memory ED34. The processor ED20 may include a main processor ED21 (e.g., a central processing unit, an application processor) and an auxiliary processor ED23 (e.g., a graphics processing unit, an image signal processor, a sensor hub processor, a communication processor) that may operate independently or in combination. The auxiliary processor ED23 may use less power than the main processor ED21 and perform specialized functions.

The auxiliary processor ED23 may take the place of the main processor ED21 while the main processor ED21 is in an inactive state (sleep state) and control functions and/or states related to some of the components of the electronic device ED01 (e.g., the display device ED60, the sensor module ED76, the communication module ED90) along with the main processor ED21, or when the main processor ED21 is in an active state (an application execution state), the auxiliary processor ED23 may control functions and/or states related to some of the components of the electronic device ED01 together with the main processor ED21. The auxiliary processor ED23 (e.g., an image signal processor, a communication processor) may be implemented as part of other functionally related components (e.g., the camera module ED80, the communication module ED90).

The memory ED30 may store various types of data required by the components of the electronic device ED01 (e.g., the processor ED20, the sensor module ED76). The data may include, for example, input data and/or output data for software (e.g., the program ED40) and commands related thereto. The memory ED30 may include the volatile memory ED32 and/or the non-volatile memory ED34. The non-volatile memory ED34 may include a built-in memory ED36 fixedly mounted in the electronic device ED01 and a removable external memory ED38.

The program ED40 may be stored as software in the memory ED30, and may include an operating system ED42, middleware ED44, and/or an application ED46.

The input device ED50 may receive a command and/or data to be used in a component of the electronic device ED01 (such as the processor ED20) from the outside of the electronic device ED01 (e.g., a user). The input device ED50 may include a microphone, a mouse, a keyboard, and/or a digital pen (e.g., a stylus pen).

The sound output device ED55 may output a sound signal to the outside of the electronic device ED01. The sound output device ED55 may include a speaker and/or a receiver. The speaker may be used for general purposes, such as multimedia playback or recording playback, and the receiver may be used to receive an incoming call. The receiver may be combined as a portion of the speaker or implemented as an independent separate device.

The display device ED60 may visually provide information to the outside of the electronic device ED01. The display device ED60 may include a display, a hologram device, or a projector and a control circuit for controlling a corresponding device. The display device ED60 may include a touch circuitry set to detect a touch and/or a sensor circuit (e.g., a pressure sensor) set to measure the intensity of force generated by the touch.

The audio module ED70 may convert sound into an electrical signal or vice versa. The audio module ED70 may acquire sound through the input device ED50, or output sound through a speaker and/or a headphone such as the sound output device ED55, and/or other electronic devices directly or wirelessly connected to the electronic device ED01 (e.g., the electronic device ED02).

The sensor module ED76 may detect an operating state of the electronic device ED01 (e.g., power, temperature) or an external environment state (e.g., a user state), and generate electrical signals and/or data corresponding to the detected state value. The sensor module ED76 may include a thermal image sensor, a gesture sensor, a gyro sensor, an atmospheric pressure sensor, a magnetic sensor, an acceleration sensor, a grip sensor, a proximity sensor, a color sensor, an infrared (IR) sensor, a bio sensor, a temperature sensor, a humidity sensor, and/or an illuminance sensor. The electronic device may further include a processor that controls an operation of the thermal image sensor and stores and outputs a signal generated by the thermal image sensor. The processor may receive a detection signal from the thermal image sensor and process the detection signal.

The interface ED77 may support one or more specified protocols that may be used to connect the electronic device ED01 to another electronic device (such as the electronic device ED02) directly or wirelessly. The interface ED77 may include a high definition multimedia interface (HDMI), a universal serial bus (USB) interface, a secure digital (SD) card interface, and/or an audio interface.

The connection terminal ED78 may include a connector through which the electronic device ED01 may be physically connected to another electronic device (e.g., the electronic device ED02). The connection terminal ED78 may include an HDMI connector, a USB connector, an SD card connector, and/or an audio connector (e.g., a headphone connector).

The haptic module ED79 may convert electrical signals into mechanical stimuli (e.g., vibration, movement) or electrical stimuli that the user may perceive through tactile or kinesthetic senses. The haptic module ED79 may include a motor, a piezoelectric element, and/or an electrical stimulation device.

The camera module ED80 may capture still images and moving images. The camera module ED80 may include a lens assembly including one or a plurality of lenses, an image sensor, image signal processors, and/or flashes. A lens assembly included in the camera module ED80 may collect light emitted from a subject that is an image capture target.

The power management module ED88 may manage power supplied to the electronic device ED01. The power management module ED88 may be implemented as a portion of a power management integrated circuit (PMIC).

The battery ED89 may supply power to the components of the electronic device ED01. The battery ED89 may include a non-rechargeable primary cell, a rechargeable secondary cell, and/or a fuel cell.

The communication module ED90 may support the establishment of a direct (wired) communication channel and/or a wireless communication channel between the electronic device ED01 and other electronic devices (e.g., the electronic device ED02, the electronic device ED04, the server ED08), and communication through the established communication channels. The communication module ED90 may include one or a plurality of communication processors that operate independently of the processor ED20 (e.g., an application processor) and support direct communication and/or wireless communication. The communication module ED90 may include a wireless communication module ED92 (e.g., a cellular communication module, a short-range wireless communication module, a global navigation satellite system (GNSS) communication module) and/or a wired communication module ED94 (e.g., a local area network (LAN) communication module, a power line communication module). Among these communication modules, a corresponding communication module may communicate with other electronic devices through the first network ED98 (a short-range communication network such as Bluetooth, WiFi direct, or infrared data association (IrDA)) or the second network ED99 (a remote distance communication network such as a cellular network, Internet, or a computer network (e.g., LAN, wide area network (WAN))). These various types of communication modules may be integrated into a single component (such as a single chip) or implemented as a plurality of separate components (multiple chips). The wireless communication module ED92 may identify and authenticate the electronic device ED01 in a communication network such as the first network ED98 and/or the second network ED99 by using subscriber information (e.g., international mobile subscriber identifier (IMSI)) stored in the subscriber identification module ED96.

The antenna module ED97 may transmit or receive signals and/or power to the outside (e.g., other electronic devices). The antenna may include a radiator including a conductive pattern formed on a substrate (e.g., a PCB). The antenna module ED97 may include one or a plurality of antennas. When a plurality of antennas are included, an antenna suitable for a communication method used in a communication network such as the first network ED98 and/or the second network ED99 may be selected from among the plurality of antennas, by the communication module ED90. Signals and/or power may be transmitted or received between the communication module ED90 and other electronic devices through the selected antenna. In addition to the antenna, other components (e.g., a radio-frequency integrated circuit (RFIC)) may be included as part of the antenna module ED97.

Some of the components may be connected to each other through communication methods between peripheral devices (e.g., a bus, a general purpose input and output (GPIO), a serial peripheral interface (SPI), a mobile industry processor interface (MIPI)) and may exchange signals (e.g., command, data).

Commands or data may be transmitted or received between the electronic device ED01 and the electronic device ED04 of the outside through the server ED08 connected to the second network ED99. The other electronic devices ED02 and ED04 may be of the same or different type as the electronic device ED01. All or part of the operations executed in the electronic device ED01 may be executed in one or a plurality of electronic devices among the electronic devices ED02, ED04, and ED08. For example, when the electronic device ED01 needs to perform a certain function or service, instead of executing the function or service itself, the electronic device ED01 may request one or a plurality of other electronic devices to perform some or all of the functions or services. One or more other electronic devices receiving the request may execute additional functions or services related to the request, and deliver a result of the execution to the electronic device ED01. To this end, cloud computing, distributed computing, and/or client-server computing technologies may be used.

A thermal image sensor according to an embodiment may include a substrate, a composite layer which includes an absorption layer, a sensor array layer arranged below the absorption layer and including a plurality of temperature sensing cells, and a pattern having one or more holes penetrating the absorption layer, and a support separating the substrate apart from the composite layer. According to the thermal image sensor and an electronic device including the same, as a pattern is included, the thermal resistance and the attainable temperature may be increased.

In the thermal image sensor according to embodiments of the disclosure and the electronic device including the same, as a composite layer includes a pattern, thermal resistance may be increased and an attainable temperature may be increased.

According to embodiments, as the thermal image sensor and the electronic device including the same include a pattern, the thermal resistance and the attainable temperature may be increased.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A thermal image sensor comprising:
a substrate;
a composite layer comprising an absorption layer and a sensor array layer provided below the absorption layer, the sensor array layer comprising a plurality of temperature sensing cells spaced apart from each other, the composite layer having a pattern formed therein, and the pattern comprising at least one hole penetrating through the absorption layer; and
a support separating the substrate from the composite layer,
wherein the sensor array layer further comprises an insulating layer around the plurality of temperature sensing cells and filling a region between the plurality of temperature sensing cells, and
wherein the at least one hole passes through the insulating layer.

2. The thermal image sensor of claim 1, wherein the pattern is configured to increase a thermal resistance of the absorption layer.

3. The thermal image sensor of claim 1, wherein the at least one hole comprises a plurality of holes provided at edge regions of the composite layer, and each hole of the plurality of holes has a rectangular cross-section.

4. The thermal image sensor of claim 1, wherein the at least one hole comprises a plurality of holes provided at a center of the composite layer, and each hole of the plurality of holes has a square cross-section.

5. The thermal image sensor of claim 1, wherein the at least one hole has a cross-sectional shape of a circle, a triangle, a quadrangle, or an ellipse.

6. The thermal image sensor of claim 1, wherein the at least one hole comprises a plurality of holes, and wherein, among the plurality of holes forming the pattern, first intervals between first holes of the plurality of holes in a center portion of the composite layer are greater than second intervals between second holes of the plurality of holes at edge regions of the composite layer.

7. The thermal image sensor of claim 1, wherein the absorption layer has a multi-layer structure.

8. The thermal image sensor of claim 1, wherein each temperature sensing cell of the plurality of temperature sensing cells comprises a magnetoresistive element.

9. The thermal image sensor of claim 8, wherein the magnetoresistive element comprises:

a first magnetic layer;

a second magnetic layer on the first magnetic layer; and a tunneling barrier layer between the first magnetic layer and the second magnetic layer.

10. The thermal image sensor of claim 9, wherein the first magnetic layer has a fixed magnetization direction, and wherein the second magnetic layer has a changeable magnetization direction.

11. The thermal image sensor of claim 8, wherein the magnetoresistive elements are arranged in series or in parallel.

12. The thermal image sensor of claim 8, wherein a width of the magnetoresistive element is from about 10 nanometers to about 100 nanometers.

13. The thermal image sensor of claim 1, further comprising a reflective layer provided on the substrate.

14. The thermal image sensor of claim 1, further comprising a transmission cap provided on the substrate and covering at least a portion of the composite layer.

15. The thermal image sensor of claim 14, wherein the transmission cap is configured to selectively transmit through long-wave infrared rays.

16. A thermal image sensor comprising:

a plurality of pixels in a plurality of rows and a plurality of columns, wherein each pixel of the plurality of pixels comprises:

a substrate;

a composite layer comprising an absorption layer and a sensor array layer provided below the absorption layer, the sensor array layer comprising a plurality of temperature sensing cells spaced apart from each other, the composite layer having a pattern formed therein, and the pattern comprising at least one hole penetrating through the absorption layer; and a support separating the substrate from the composite layer, wherein the sensor array layer further comprises an insulating layer around the plurality of temperature sensing cells and filling a region between the plurality of temperature sensing cells, and wherein the at least one hole passes through the insulating layer.

17. The thermal image sensor of claim 16, wherein the at least one hole comprises a plurality of holes provided at edge regions of the composite layer, and each hole of the plurality of holes has a rectangular cross-section.

18. An electronic device comprising:

a thermal image sensor; and a processor configured to receive a sensing signal from the thermal image sensor and process the sensing signal, wherein the thermal image sensor comprises:

a substrate;

a composite layer comprising an absorption layer and a sensor array layer provided below the absorption layer, the sensor array layer comprising a plurality of temperature sensing cells spaced apart from each other, the composite layer having a pattern formed therein, and the pattern comprising at least one hole penetrating through the absorption layer; and a support separating the substrate from the composite layer, wherein the sensor array layer further comprises an insulating layer around the plurality of temperature sensing cells and filling a region between the plurality of temperature sensing cells, and wherein the at least one hole passes through the insulating layer.

* * * * *